United States Patent
Brunson et al.

[11] Patent Number: 6,066,228
[45] Date of Patent: May 23, 2000

[54] METHOD FOR MAKING A METALLIC HONEYCOMB CARRIER BODY

[75] Inventors: Gordon Wayne Brunson, Chagrin Falls; Bryce Zoccola, Masury, both of Ohio

[73] Assignee: Engelhard Corporation, Iselin, N.J.

[21] Appl. No.: 09/048,325

[22] Filed: Mar. 26, 1998

Related U.S. Application Data

[62] Division of application No. 08/728,641, Oct. 10, 1996.

[51] Int. Cl.$^7$ ...................................................... B32B 3/12
[52] U.S. Cl. ............................ 156/294; 156/423; 428/9; 428/116; 428/593
[58] Field of Search .................................... 428/116, 118, 428/593, 9; 156/197, 294, 423

[56] References Cited

U.S. PATENT DOCUMENTS

| | | | |
|---|---|---|---|
| 4,093,423 | 6/1978 | Neumann | 422/180 |
| 4,347,219 | 8/1982 | Noritake et al. | 422/180 |
| 4,711,009 | 12/1987 | Cornelison et al. | 428/116 X |
| 4,713,361 | 12/1987 | Maus | 428/116 X |
| 4,891,257 | 1/1990 | Humpolik et al. | 428/593 X |
| 4,976,103 | 12/1990 | Takikawa et al. | 422/180 X |
| 5,557,847 | 9/1996 | Koshiba et al. | 29/890 |
| 5,667,875 | 9/1997 | Usui | 428/116 X |
| 5,735,158 | 4/1998 | Brunson | 428/116 X |
| 5,737,839 | 4/1998 | Whittenberger et al. | 428/593 X |

FOREIGN PATENT DOCUMENTS

| | | | |
|---|---|---|---|
| WO96/04509 | 2/1996 | WIPO | 428/116 |

*Primary Examiner*—Henry F. Epstein
*Attorney, Agent, or Firm*—Beverly J. Artale

[57] ABSTRACT

A method for making a honeycomb carrier body and product formed thereby in which a corrugated foil strip is provided having opposite side edges and corrugations oriented at an oblique angle to the side edges. The corrugated foil strip is folded on lines perpendicular to the side edges to provide a core body having fluid passages between opposite ends and a shaped periphery defined by parallel outside folds in the corrugated strip. The core body thus formed is inserted into a jacket tube so that folds at the core body periphery are in compressive contact with the jacket tube, and the periphery of the core body is joined to the jacket tube. Preferably, the corrugated foil strip is coated before the folding step, such as with an oxide layer, a catalytic coating or both, prior to the folding step. The periphery of the folded core body is then cleaned such as by grit blasting to remove the coating and reveal a clean metallic surface at the outside folds of the foil strip before the body is inserted into the jacket tube.

31 Claims, 6 Drawing Sheets

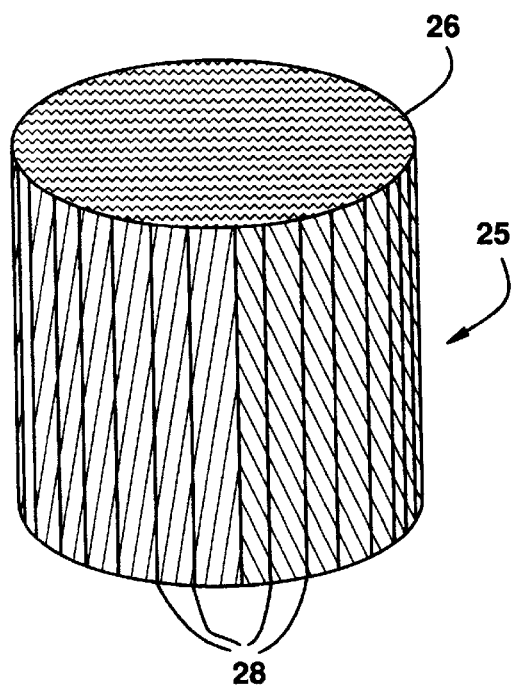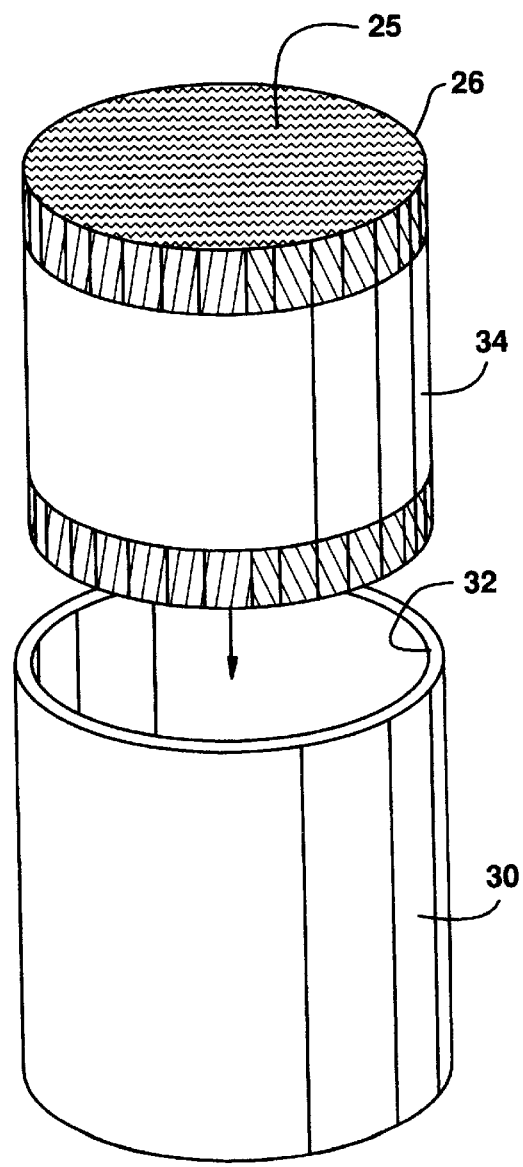

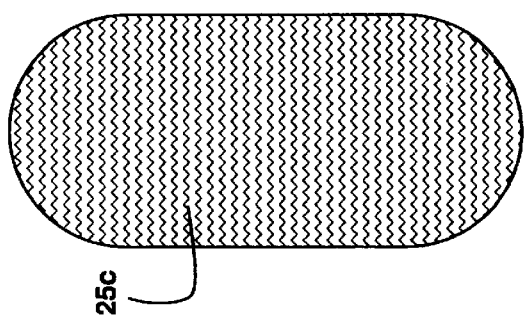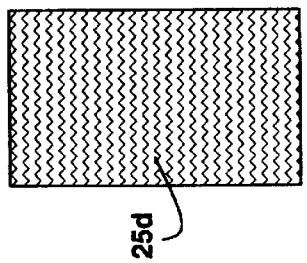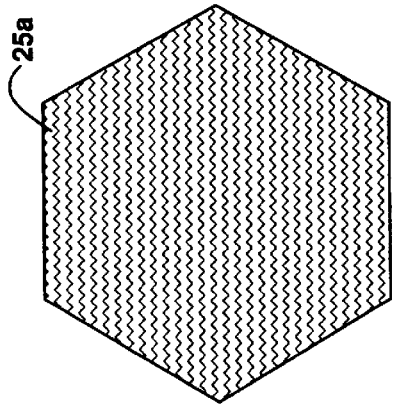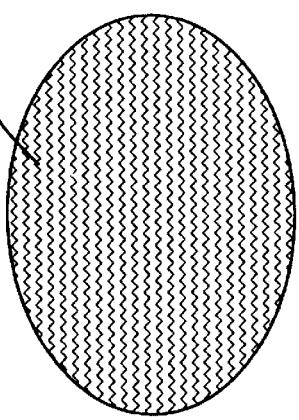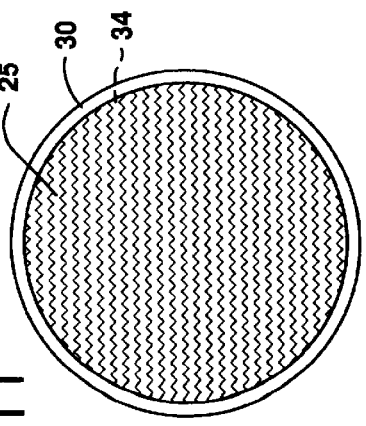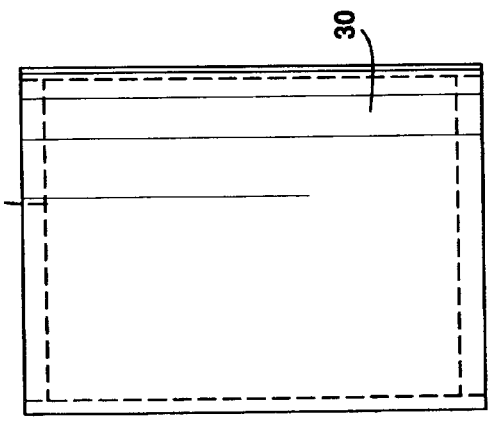

METHOD FOR MAKING A METALLIC HONEYCOMB CARRIER BODY

This is a division of application Ser. No. 08/728,641, filed Oct. 10, 1996.

BACKGROUND OF THE INVENTION

1. Field of the Invention

The present invention relates to metallic honeycomb carrier bodies, and, more particularly, to such metallic honeycomb carrier bodies for use as catalytic converters in vehicular engines to control exhaust emissions, and to methods for the manufacture of such carrier bodies and converters.

2. Description of the Related Art

Metallic honeycomb carrier bodies for catalytic converters have been formed conventionally by arranging corrugated thin metal foil sheets in a core body to provide fluid passageways or "cells" extending between opposite ends of the body. The body thus formed is secured within a jacket tube by soldering, brazing or welding to provide structural support for the foil sheets.

Most typically, the fluid passageways have been formed by alternating layers of corrugated and relatively flat foil sheets so that to the extent the foil sheets are in full contact with each other, the individual passageways are self contained or represent closed cells in cross section. The flat sheets additionally function to separate the corrugated sheets, which otherwise would nest one within the other without open space for the passage of fluid.

Open honeycomb core structures have been formed entirely of superimposed corrugated sheets in which the pattern of corrugations prevents nesting of adjacent sheets. For example, the metallic foil sheets may be formed with chevron-shaped corrugations in a "herringbone" pattern so that when adjacent sheets are reversed end for end, the corrugations on one sheet cross those of the other sheet at points of contact to prevent nesting. The resulting pattern of passageways across the widths of the sheets extend in crossing zig-zag paths and are in the nature of trough-like channels in fluid communication with each other because the tops of the channels are open except at the points of crossing by the corrugations of an adjacent sheet.

A problem with the herringbone pattern of corrugations is a weakness at the points where the corrugations change directions. In particular, under heat and physical stress, these points of weakness tend to fracture with use, especially under conditions peculiar to automotive catalylitic converters. In addition the zig-zag paths of the flow passages in a herringbone pattern tend to create an unwanted high pressure drop under fluid flow velocities.

An open honeycomb core structure is also obtained by superimposing adjacent corrugated sheets in which the corrugations extend along straight lines skewed across the widths of the sheets at oblique angles to the lengths of the sheets. By reversing any two such sheets end for end, a crossing pattern of corrugations and passageways is formed across the widths of the sheets. Although the passageways are again in the nature of interconnected troughs, they extend linearly across the widths of the sheets, albeit in crossing angular paths, and present less obstruction to fluid flow than the zig-zag paths of the chevron pattern of corrugations.

Although the skewed crossing pattern has been recognized as useful for honeycomb carrier bodies for catalytic converters, there has been very little, if any, practical application of this pattern to metallic catalytic converters for use by the automotive industry, which requires survival of very severe tests known as the Hot Shake Test, the Hot Cycling Test, combinations of these tests, cold vibration testing, water quench testing, and impact testing.

The Hot Shake test involves oscillating (50 to 200 Hertz and 28 to 80 G inertial loading) the device in a vertical, radial or angular attitude at a high temperature (between 800 and 1050degrees C.; 1472 to 1922 degrees F., respectively) with exhaust gas from a gas burner or a running internal combustion engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is run with exhaust flowing at 800 to 1050 degrees C.; (1472 to 1922 degrees F.) and cycled to 120 to 200 degrees C. once every 13 to 20 minutes for up to 300 hours. Telescoping or separation of the leading edges of the thin metal foil strips, or mechanical deformation, cracking or breakage is considered a failure.

Also, the Hot Shake Test and the Hot Cycling Test are sometimes combined, that is, the two tests are conducted simultaneously or superimposed one on the other.

To survive these automotive industry tests, it is important that the core body of the honeycomb carrier is strongly secured at its periphery to the interior of the supporting jacket tube. In using foil sheets with a skewed pattern of corrugations, for example, and to accommodate different jacket tube cross-sectional shapes, the core body is most efficiently formed by reverse folding a continuous strip of corrugated sheet material in programed accordion fashion so that lines at outside folds generate a body core periphery complementing the interior of the jacket tube.

Because of inaccuracies inherent in folding the corrugated strip, it is not possible, using presently known folding equipment, for every outside fold to lie with precise uniformity at the core body periphery intended to complement the jacket tube interior. Some of the folds will lie slightly within and others will lie slightly outside the intended core body periphery. As a result, all outside folds, which represent the ends of the working sheets in the carrier core body, cannot be secured to the jacket interior with equal strength, using known soldering or brazing techniques. More significantly, many of the folds may remain fully unsecured to the jacket tube interior, thus leading to failure of the carrier body during conduct of the described testing.

From the foregoing, it will be appreciated that catalytic converter bodies and their method of manufacture have received considerable attention, particularly by the automotive industry, are complex in design and manufacture, and are in need of improvement.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the method of the invention is directed to making a metallic honeycomb carrier body in which a corrugated metallic foil strip is provided having opposite side edges and obliquely oriented corrugations between the side edges. The corrugated foil strip is folded on lines perpendicular to the side edges to provide a core body having fluid passages between opposite ends and a shaped periphery defined by parallel outside folds in the corrugated strip. The core body thus formed is inserted into a jacket tube so that at least some of the folds at the core body periphery are in contact, preferably under compression, with the jacket tube, and the periphery of the core body is joined to the jacket tube. Preferably, all or substantially all peripheral folds are in contact with the jacket.

Preferably, the corrugated foil strip is coated with an oxide layer, a catalytic coating or both. The coating step preferably occurs prior to the folding step. The periphery of the folded core body is then cleaned to remove the coating and reveal a clean metallic surface at the outside folds of the foil strip before the body is inserted into the jacket tube.

In another aspect, the invention is a honeycomb carrier body having a metal jacket with an interior surface, and a core body having a length between opposite ends and a periphery defined by folds in a corrugated strip, the interior surface of the jacket engaging the core body to be in contact with the folds at the periphery of the core body. The periphery of the core body is joined to the interior surface of the jacket.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 3 is a perspective view illustrating a honeycomb carrier core body formed by folding the strip shown in FIG. 1;

FIG. 4 is an exploded perspective view depicting the assembly of the core body with a jacket tube;

FIG. 11 is a plan view illustrating the honeycomb carrier body product of the invention;

FIG. 12 is a side elevation of the carrier body illustrated in FIG. 11; and

FIGS. 13–16 are plan views showing alternative configurations of core bodies that may be formed by and used in the present invention.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
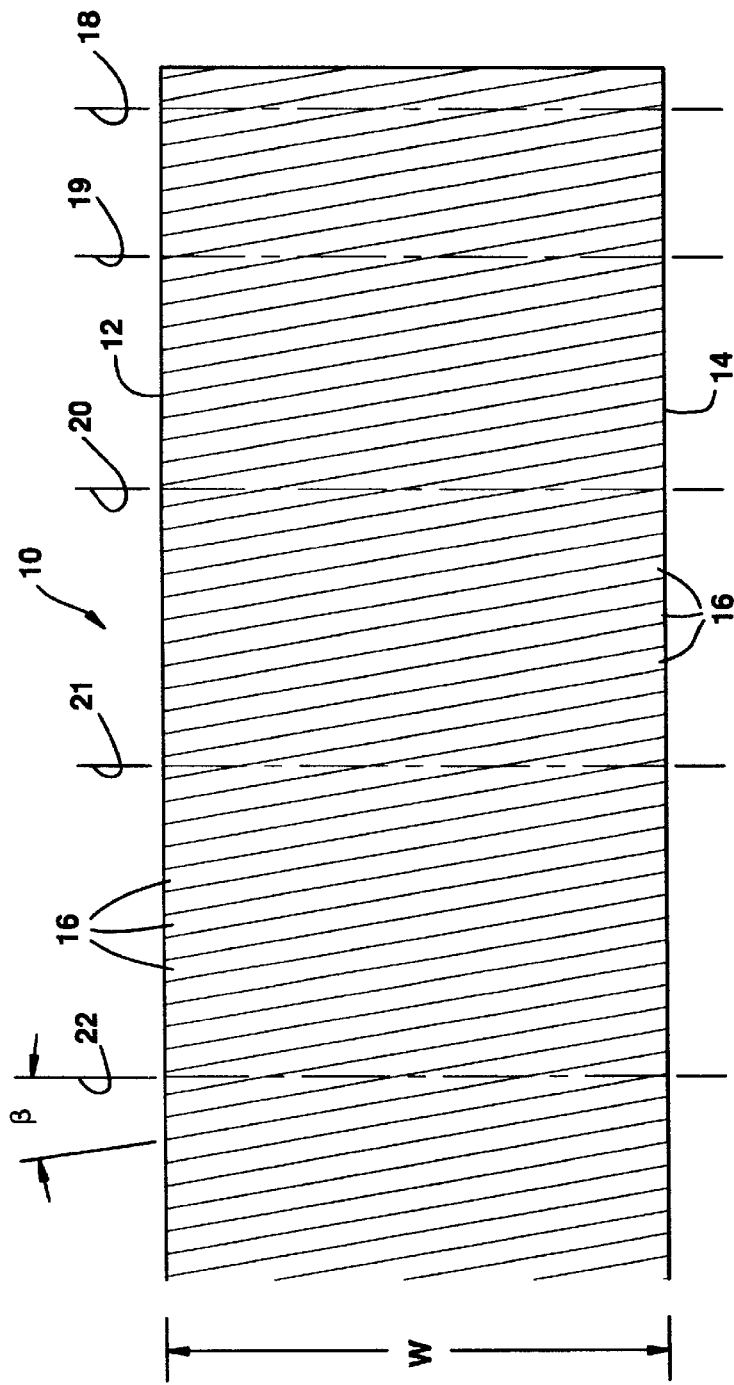
FIG. 1 is a plan view illustrating a fragment a skewed corrugated strip used in the invention.

In accordance with the present invention, a honeycomb carrier core body is formed from a corrugated foil strip in which corrugations are oriented at an oblique angle to side edges of the strip. An embodiment of such a foil strip is shown in FIGS. 1 and 2 of the drawings and generally designated by the reference numeral 10.

The illustrated strip 10 is initially of an undefined or continuous length and has opposite side edges 12 and 14 to establish a strip width W which may vary between 1 and 9 inches, depending on the size of the core body to be formed. The strip 10 is "skew corrugated," that is, the corrugations 16 extend on linear paths between the side edges 12 and 14, and are inclined at an oblique angle $\beta$ with respect to the side edges. Ideally, the angle $\beta$ is the same for all corrugations and is preferably in a range of from 4° to 15°. In practice, the oblique angle of individual corrugations may vary relative to others of the corrugations, although the angles $\beta$ for all corrugations will fall within the preferred range.

Figure 2:
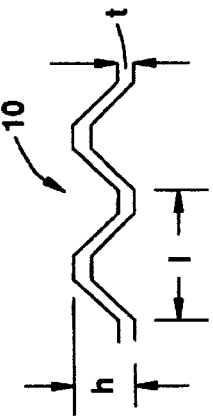
FIG. 2 is an enlarged fragmentary side profile of the corrugated strip shown in FIG. 1.

In FIG. 2, the side profile of the foil strip 10 is shown at an enlarged scale to reveal an exemplary shape and relative dimensions of the corrugations 16. As shown, each corrugation 16 has a height h and a pitch length l. The thickness of the foil material from which the strip 10 is formed is designated by t.

In some applications, corrugations preferably have a height h of from about 0.01 inch to about 0.15 inch, and a pitch length l of from about 0.02 inch to about 0.25 inch. The height and pitch length of the corrugations determine cell density, that is, the number of cells per unit of cross-sectional area in the converter body, in accordance with the equation:

$$c = \cos \beta / h\, l \tag{1}$$

Typically, the cell density c is expressed in cells per square inch (cpsi) and, in some applications, may vary from about 50 cpsi to 1000 cpsi.

The foil strip 10 may be constructed from "ferritic" stainless steel such as that described in U.S. Pat. No. 4,414,023 to Aggen. One usable ferritic stainless steel alloy contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trade designation "Alfa IV."

Another usable commercially available stainless steel metal alloy is identified as Haynes 214 alloy. This alloy and other useful nickeliferous alloys are described in U.S. Pat. No. 4,671,931 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steels, are examples of high temperature resistive, oxidation resistant (or corrosion resistant) metal alloys that are useful for use in making the foil strip and core body sheet elements of the present invention, as well as the multicellular honeycomb converter bodies thereof. Suitable metal alloys must be able to withstand "high" temperature, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal or foil, that is, having a thickness of from about 0.001" to about 0.005", and preferably from 0.0015" to about 0.0037".

The foil strip 10 is preferably precoated after it has been corrugated, but before assembly into a honeycomb core body, such as described in U.S. Pat. No. 4,711,009 Cornelison et al.

The foil strip may also be coated after assembly into a honeycomb body, such as by dip coating, for example.

The coating is preferably a catalyst support material, such as a refractory metal oxide, e.g., alumina, alumina/ceria, titania, titania/alumina, silica, zirconia, etc., and if desired, a catalyst may be supported on the refractory metal oxide coating. For use in catalytic converters, the catalyst is normally a noble metal, e.g., platinum, palladium, rhodium, ruthenium, indium, or a mixture of two or more of such metals, e.g., platinum/rhodium. The refractory metal oxide coating is generally applied En an amount ranging from about 10 mgs/square inch to about 80 mgs/square inch. The catalyst may also be coated directly onto the foil strip.

In accordance with the present invention, the skew corrugated foil strip is folded on lines perpendicular to the side edges thereof to provide a core body with a shaped periphery defined principally by parallel outside folds in the corrugated strip. In particular, the foil strip is reverse folded in accordion fashion on fold lines spaced at intervals selected to generate the desired peripheral shape of the core body. The overlying adjacent segments of the strip between the folds provide fluid passages between the ends of the core body.

In FIG. 1, exemplary parallel fold lines are designated by the reference numerals 18, 19, 20, 21, and 22. These fold lines are also shown to be spaced at increasing intervals, from right to left in FIG. 1, to generate part of a core body 25 having a circular periphery, as shown in FIG. 3. Although the spacing of fold lines in FIG. 1 is not precise and representative only, given the height h of corrugations in the strip 10, folding that strip to generate the circular periphery shown in FIG. 3, is easily accomplished using known algorithms and computer controlled folding apparatus, for example. As a result of the folding operation, adjacent chord-like segments of the strip 10 extend between pairs of outside folds 28 located at the core periphery 26. Also, the corrugations 16 of adjacent strip segments cross each other in non-nesting relation to provide a network of fluid passages between the ends of the core body 25.

The crossings of corrugations establish contact points between adjacent strip segments, and serve to provide support for the individual foil segments or layers in a direction perpendicular to the chords on which they lie. The number of contact points between each strip segment or layer in the core body 25, therefore, represents a parameter contributing to strength and durability of the core body 25 in the completed honeycomb carrier body in which it is used. It is preferred that each corrugation in one strip segment or layer cross with corrugations in an adjacent layer at least 6 contact points, more preferably 8 contact points. The number of contact points Np is dependent on the width W of the strip 10, the angle β of the skewed corrugations, and the pitch length l of the corrugations in the equation:

$$Np = 2W \sin \beta / l \qquad (2)$$

After the core body is folded and assembled to the configuration shown in FIG. 3, for example, it is temporarily secured such as by tying a string or placing a rubber band about the periphery thereof. The periphery 26 of the core body 25, particularly the outside folds 28, are cleaned to reveal a clean metallic surface at each of the outside folds 28. All coating materials applied to the strip 10 are removed by the cleaning from at least the outside folds 28. The cleaning may be accomplished, for example, by grit blasting the surfaces on the periphery of the core body 25, using aluminum oxide particles in a high velocity stream of compressed air. Silicon carbide grit also may be used. Other cleaning methods may be used to remove coating and other foreign materials from the periphery of the folded core body 25. For example, the periphery of the core body may be scraped or abraded with an assortment of well known tools, such as files, abrasive stones, wire wheels and the like. Also, it is within the scope of the invention to provide a clean metal surface at the folds by masking the fold lines prior to coating.

After assembly and cleaning as described, the core body of the invention is inserted into a jacket tube so that folds at the core body periphery are in contact, preferably under compression, with the interior of the jacket tube, and the periphery of the core body is joined to the jacket tube. When the foil strip from which the core body is formed is precoated, the core body periphery is first cleaned to reveal a clean metallic surface at the outside of each fold.

In the illustrated embodiment and as depicted in FIG. 4, the core body 25 is inserted axially into a jacket tube 30 of cylindrical configuration to complement the exterior shape of the core body 25. The jacket tube 30 has an interior surface 32 and is formed preferably of stainless steel having a thickness of from about 0.03 inch to about 0.08 inch, preferably 0.04 inch to 0.06 inch. Prior to insertion, the interior surface 32 of the jacket tube 30 is coated with a brazing alloy such as AMDRY Alloy 770, 0.002 inches in thickness. Alternatively, and as illustrated in FIG. 4, the core body 25 may be wrapped in a brazing foil 34 as a way of providing a layer of brazing alloy between the outer periphery 26 of the core body 25 and the interior surface 32 of the jacket 30.

It is important that a sufficient number of the outside folds 28 at the periphery 26 of the core body 25 be in contact with the interior surface 32 of the jacket tube 30 to ensure a secure joining of the folds 28 to the interior surface 32 of the jacket. In accordance with the invention, this contact of outside folds at the periphery 26 of the core body 25 with the interior surface 32 of the jacket 30 is preferably achieved by compressing the core body 25 to reduce its diameter approximately one to three percent. The reason for this compression and accompanied reduction in diameter of the core body 25 may be appreciated from the illustrations in FIGS. 5 and 6 of the drawings.

Figure 5:
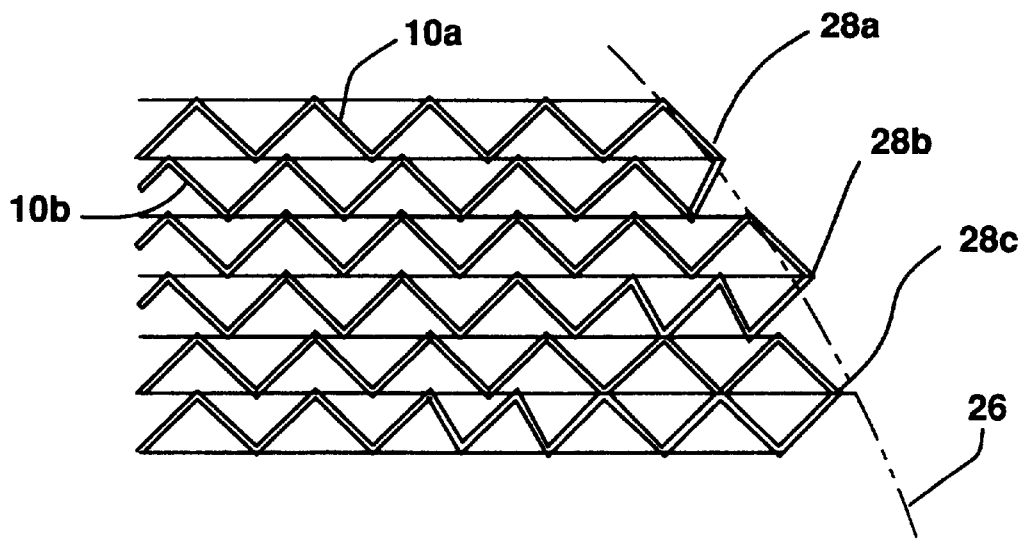
FIG. 5 is an enlarged fragmentary end view of the core body shown in FIG. 3.
Figure 6:
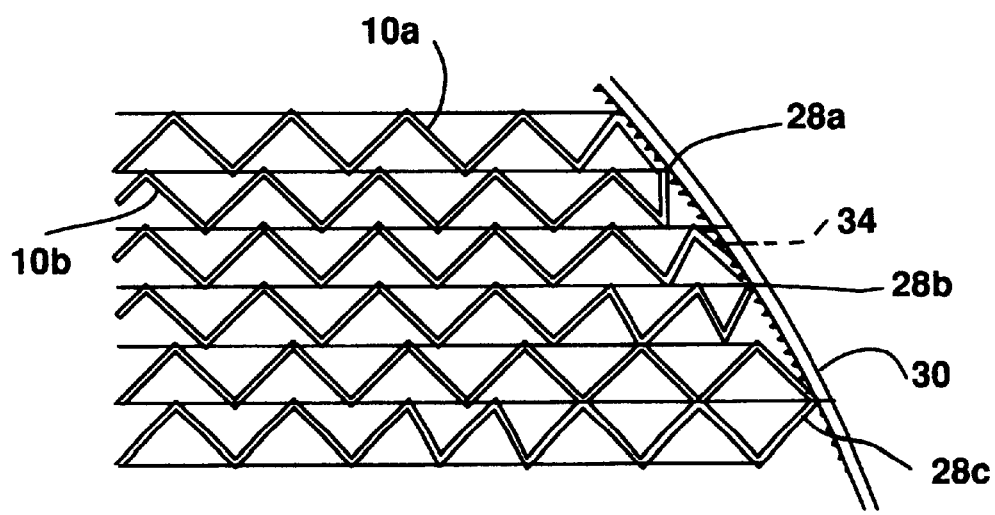
FIG. 6 is an enlarged fragmentary end view, similar to FIG. 5, but illustrating the core body and jacket after assembly.

As shown in FIG. 5, adjacent layers or segments of the corrugated strip, designated 10a and 10b, are joined at the intended periphery 26 by fold lines 28a, 28b and 28c. Because of imperfections in the folding of the foil strip 10 with presently known folding equipment, it is not possible for the folds 28 to lie precisely on the intended periphery 26 of the core body 25. Thus, and as shown in FIG. 5, the fold 28a lies outside of the intended periphery 26, the fold 28b lies outside the intended periphery 26 and the fold 28c lies within the intended periphery 26. As shown in FIG. 6, after the core body 25 is inserted into the jacket 30 and is placed under compression against the inner surface 33 on which the brazing alloy 34 is located, the folds 28a and 28b are compressed to be strained or deformed inwardly so that all three folds firmly contact the brazing alloy 34. It should be understood that illustration in FIGS. 5 and 6 is for purposes of explanation only and that in practice, the respective folds 28 at the periphery of the core body, as folded, will deviate randomly from the intended periphery or that which complements the inner surface 32 of the jacket tube 30.

Figure 7:
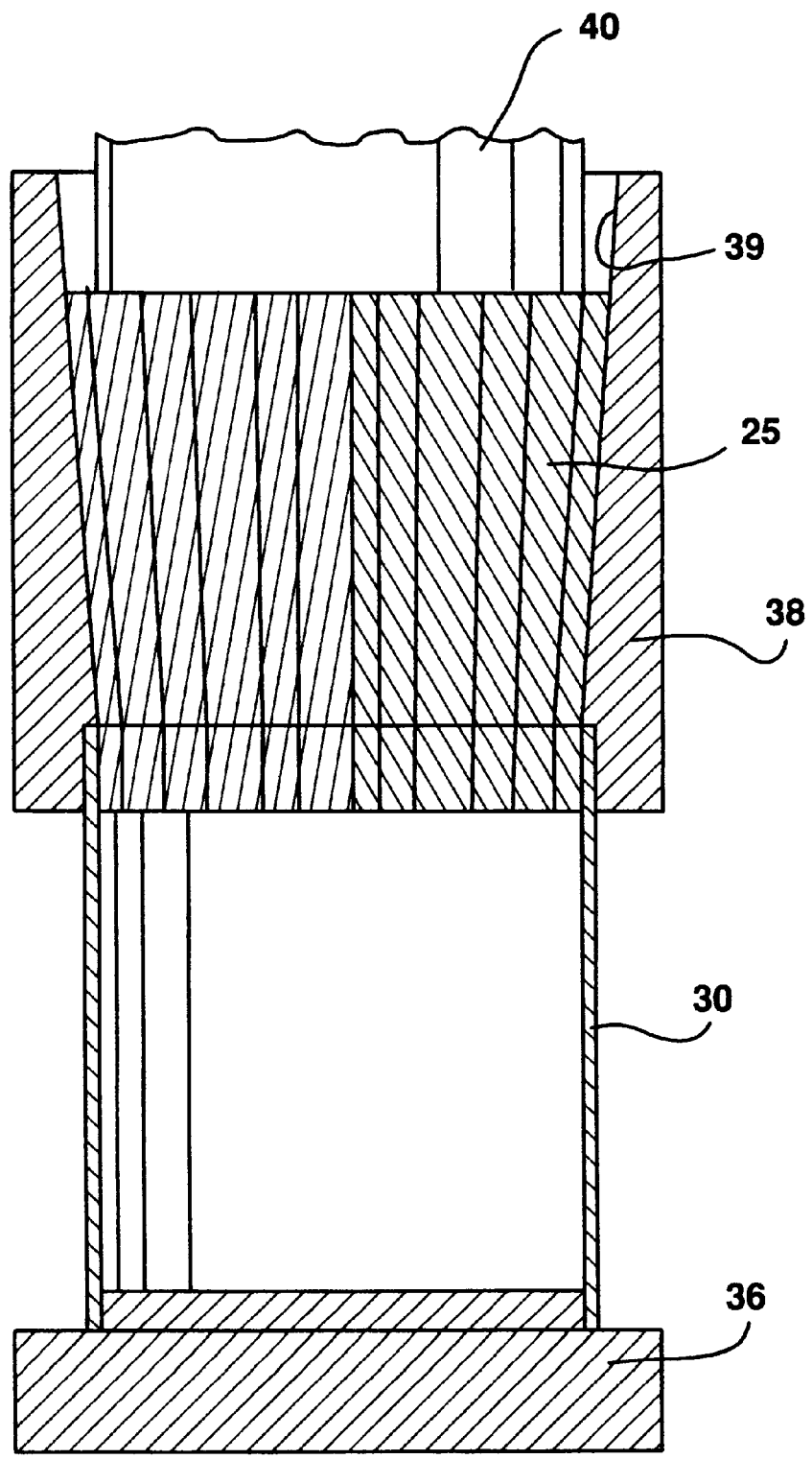
FIG. 7 is a fragmentary cross section illustrating a preferred way of inserting the core body of the invention into a jacket tube.

A preferred way of attaining insertion of the core body 25 into the jacket tube 30 is depicted in FIG. 7. As shown, the jacket tube 30 is mounted on a pedestal 36 and fitted at its upper end with an annular tapered die 38 having a frusto conical inner surface 39 which converges downwardly to an inside diameter equal to the inside diameter of the jacket tube 30. A ram 40 is used to force the core body 25 through the tapered inner surface 39 of the die 38 so that as the core body enters the jacket tube 25 it is compressed to reduce the diameter of the core body periphery 26 by the approximately one to three percent indicated above.

Figure 8:
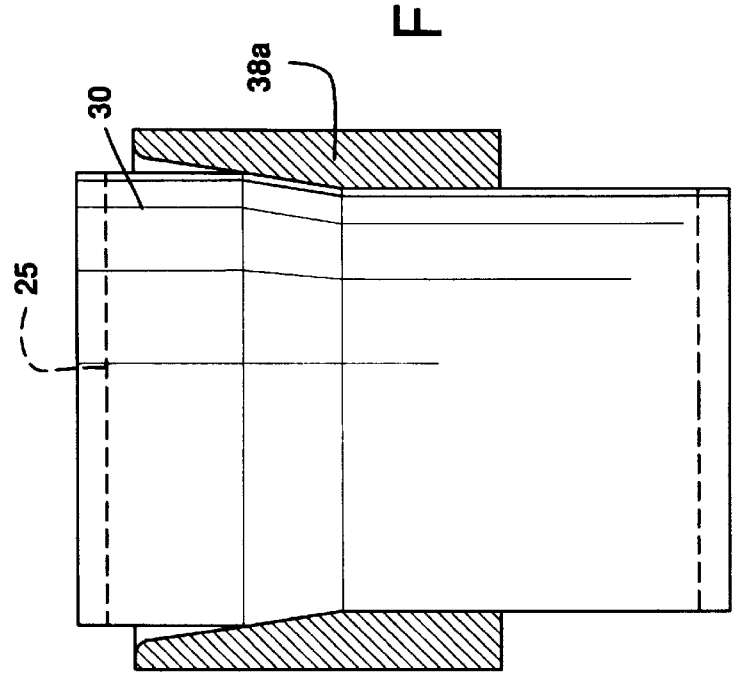
FIG. 8 is a cross section illustrating a swaging operation of the assembled core body and jacket tube after assembly.

From the illustration in FIG. 7, it will be understood that the exterior periphery of the core body 25 is swaged upon insertion into the jacket tube 30 and thereafter retained in compressive contact with the interior surface 32 of the jacket tube. Alternatively, the core body 25 may be inserted into the jacket tube 30 without compression on insertion as depicted in FIG. 4. The periphery of the jacket tube 30 is then reduced by swaging the exterior of the jacket tube using a die 38a as shown in FIG. 8. After reducing the peripheral diameter of the jacket tube 30 in this manner, the core body is placed under compressive contact with the jacket tube 30.

Figure 9:
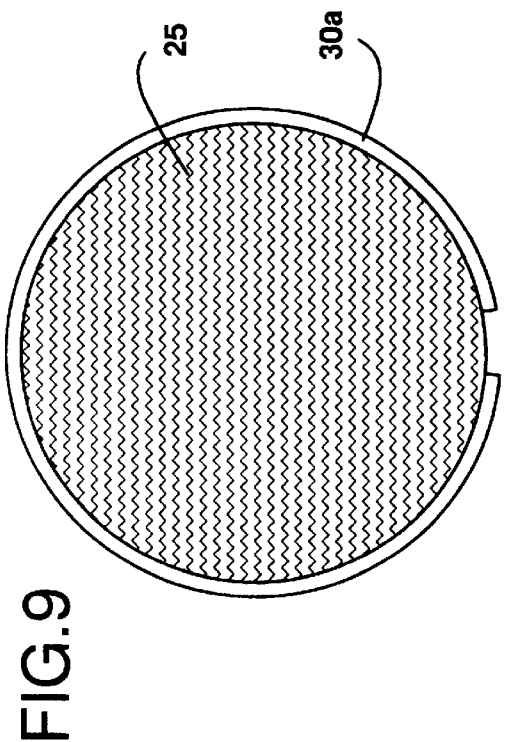
FIG. 9 is a plan view illustrating an alternative manner of assembling the core body and jacket tube.
Figure 10:
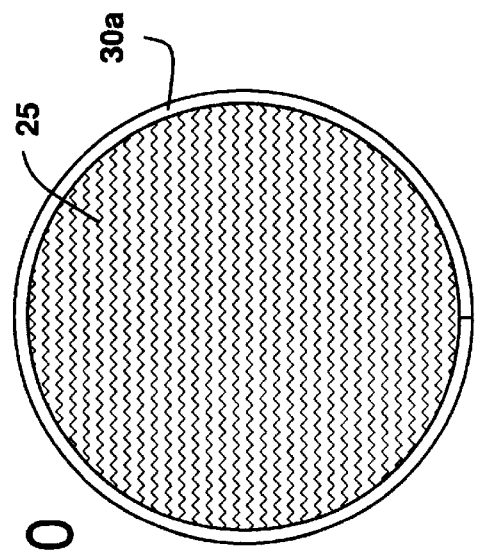
FIG. 10 is a plan view illustrating the core body and jacket tube of FIG. 9 after assembly is completed.

A still further alternative to attainment of a compressive loading of the core body periphery 26 against the interior of the jacket tube 30 is to insert the core body 25 into the jacket tube while it is expanded and before it is closed by welding or brazing. This embodiment is illustrated in FIGS. 9 and 10 of the drawings. After insertion of the core body 25 with the jacket tube 30a opened as shown in FIG. 9, the open jacket tube is then compressed radially against the core body to be closed along its length. The previously open slit is then joined by brazing or welding to secure the compressed core body 25.

The compressive loading of the core body periphery and the inner surface of the jacket tube against each other after the core body is inserted into the jacket tube, as described with reference to FIGS. 8–10, offers a facility for mechanically joining the periphery 26 of the core body 25 to the interior of the jacket tube 30. For example, the inside surface 32 of the jacket tube 30 may be roughened by various forms and shapes of surface irregularities, such as peripheral striations, threads, barbs, relieved coating materials, and the like, so that when the jacket tube is compressed against the inserted core, a mechanical retention of the core body 25 within the jacket tube 30 is effected. Such a mechanical retention may be combined with a bond typified by brazing and, in some instances, may be used as a substitute for brazing. Thus, the term "join," as used herein and in the appended claims, to characterize the connection of the core body periphery to the jacket tube, is intended to encompass mechanical and bonding connections, as well as a combination of both.

To braze the folds 28 at the periphery of the core body to the inside surface 32 of the jacket tube 30 the compressed assembly of the core body and jacket tube preferably is put in a chamber. Air is evacuated and the chamber is backfilled with a non-oxidizing gas, preferably an inert gas such as argon. Also, a vacuum can be used without a gas backfill, so long as the remaining atmosphere is non-oxidizing. Also in the chamber is an induction coil which extends around the jacket tube with about eighth to a quarter inch clearance between the coil and the jacket tube. When the induction coil is energized, it heats the jacket tube and the outer folds of the foil by induction with a very localized heating effect, melting the brazing metal between the periphery of the core body and the jacket tube. The outside folds of the core body do not have the coating on them so they braze nicely to the interior surface of the jacket tube.

In accordance with the invention, the aforementioned method provides a honeycomb carrier body having a metal jacket, a core body having a length between opposite ends and a periphery defined by folds in a corrugated strip, the interior surface of the jacket engaging the periphery of the core body to be in contact with all folds at the periphery, and a bond between the periphery of the core body and the interior surface of the jacket.

In a preferred embodiment illustrated in FIGS. 11 and 12, a core body 25 of circular cross section is secured under compression within a jacket tube 30 and also by a bond 34, preferably of brazing material, between the outer periphery of the core body 25 and the interior of the jacket tube 30. As shown in FIG. 12, the jacket tube is of a length slightly larger than that of the core body 25 so that the ends of the core body are recessed into the ends of the jacket tube 30.

Because of the facility offered by the method of forming the core by selected fold spacing intervals along a continuous corrugated strip, configurations other than the circular cylindrical configuration shown in FIGS. 11 and 12 are within the scope of the invention. Thus, in FIG. 13, a polygonal, more particularly, a hexagonal end configuration of a core body 25a is illustrated. In FIG. 14, an elliptical end profile is shown in which the layers of corrugated foil extend across the minor axis of the ellipse. A variation of the elliptical end profile shown in FIG. 14 is illustrated in FIG. 15. Thus, in FIG. 15, the end profile of the core body 25c is oblong or "racetrack" shaped. Finally, in FIG. 16, a core body 25d is illustrated as having a rectangular end profile. In each of the embodiments illustrated in FIGS. 11–16, the exterior configuration of the honeycomb carrier body is an erect parallelepiped, that is, the peripheral surfaces of the core body are generated by straight lines parallel with each other and also parallel with the central axis of the core body.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a metallic honeycomb carrier body comprising the steps of:

providing a corrugated metallic foil strip having opposite side edges and obliquely oriented corrugations between the side edges;

folding the corrugated foil strip on lines perpendicular to the side edges to provide a core body having fluid passages between opposite ends and a shaped periphery defined by folds in the corrugated strip;

providing a metal jacket tube having an interior surface;

inserting the core body into the jacket tube, the interior surface of the jacket tube engaging the periphery of the core body to be in compressive contact with the folds defining the periphery of the core body to deform the folds inwardly at the periphery of the core body; and joining the periphery to the core body of the jacket tube.

2. The method of claim 1 wherein substantially all of the folds are in contact with the jacket tube.

3. The method of claim 2 wherein all of the folds are in contact with the jacket tube.

4. The method of claim 1 wherein the corrugations extend in linear paths between the side edges of the metallic foil strip.

5. The method of claim 4 wherein the linear paths extend at oblique angles with respect to the side edges.

6. The method of claim 5 wherein the linear paths extend at substantially the same oblique angle.

7. The method of claim 6 wherein the oblique angle is in a range of from 4° to 15°.

8. The method of claim 1 comprising the step of coating the corrugated foil strip before said folding step.

9. The method of claim 8 wherein the corrugated foil strip is treated to include an oxide layer prior to the coating step.

10. The method of claim 8 wherein the corrugated foil strip is coated with a catalyst coating.

11. The method of claim 8 wherein the corrugated foil strip is heat treated to form an oxide layer and subsequently coated with a catalyst coating.

12. The method of claim 8 comprising the step of cleaning the core body to remove the coating from the outside of folds at the periphery thereof before said inserting step.

13. The method of claim 12 wherein said cleaning step comprises grit blasting the periphery of the core body to reveal a clean metallic surface on the outside of the folds.

14. The method of claim 13 wherein the periphery of the core body is grit blasted with at least one of aluminum oxide and silicon carbide.

15. The method of claim 12 wherein said cleaning step comprises scraping the periphery of the core body to reveal a clean metallic surface on the outside of the folds.

16. The method of claim 12 wherein said cleaning step comprises wire brushing the periphery of the core body to reveal a clean metallic surface on the outside of the folds.

17. The method of claim 1 comprising closing a split jacket tube onto the core body to develop the compressive contact between the body periphery and the jacket tube and joining the split jacket tube while closed.

18. The method of claim 1 comprising swaging at least one of the core body and the jacket tube to develop the compressive contact between the body periphery and the jacket tube.

19. The method of claim 18 wherein the core body is swaged during insertion of the core body into the jacket tube.

20. The method of claim 18 wherein the jacket tube is swaged over the core body after insertion of the core body into the jacket tube.

21. The method of claim 1 wherein said joining step comprises brazing the periphery of the core body to the jacket tube.

22. The method of claim 21 wherein the brazing is confined to the periphery of the core body and the jacket tube.

23. The method of claim 21 wherein said brazing comprises placing the core body and jacket in a non-oxidizing atmosphere and induction heating the core body periphery and jacket tube.

24. The method of claim 23 wherein the non-oxidizing atmosphere is an inert gas.

25. The method of claim 1 wherein said folding step comprises reverse folding the corrugated foil on fold lines selectively spaced to shape the periphery of the core body.

26. The method of claim 25 wherein said fold lines are selectively spaced to provide a circular periphery on the core body.

27. The method of claim 25 wherein said fold lines are selectively spaced to provide an elliptical periphery on the core body.

28. The method of claim 25 wherein said fold lines are selectively spaced to provide a polygonal periphery on the core body.

29. The method of claim 25 wherein said fold lines are selectively spaced to provide a rectangular periphery on the core body.

30. The method of claim 25 wherein said fold lines are selectively spaced to provide an oval periphery on the core body.

31. The method of claim 1 wherein said outside folds are substantially parallel.

* * * * *